June 13, 1961   J. ADAMS   2,987,795
MACHINE FOR MANUFACTURING BUILDING BLOCKS
Filed Aug. 11, 1955   3 Sheets-Sheet 1

Julius Adams
INVENTOR.

BY Clarence A. O'Brien
and Harvey B. Jacobson
Attorneys

June 13, 1961     J. ADAMS     2,987,795
MACHINE FOR MANUFACTURING BUILDING BLOCKS
Filed Aug. 11, 1955     3 Sheets-Sheet 2
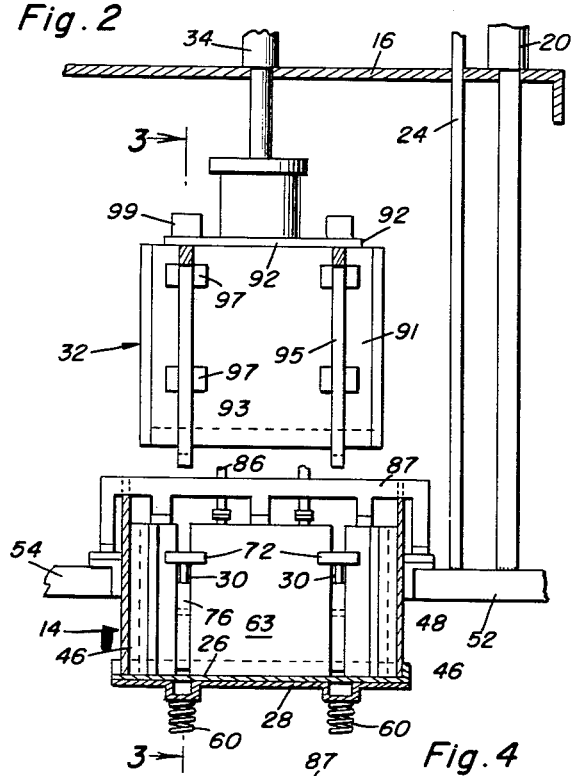
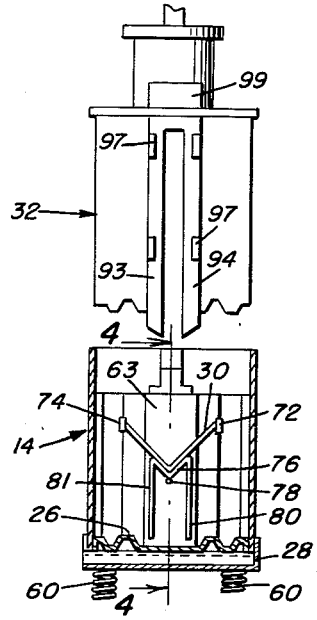
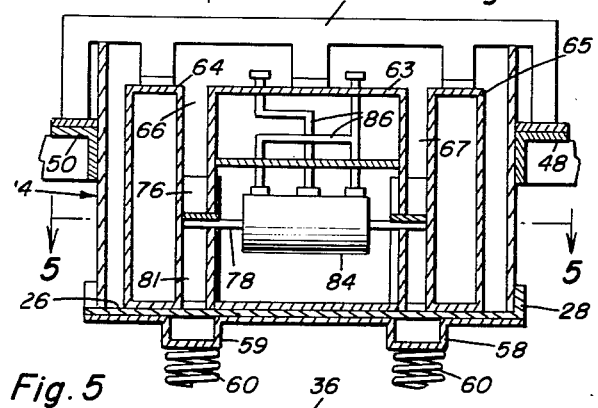
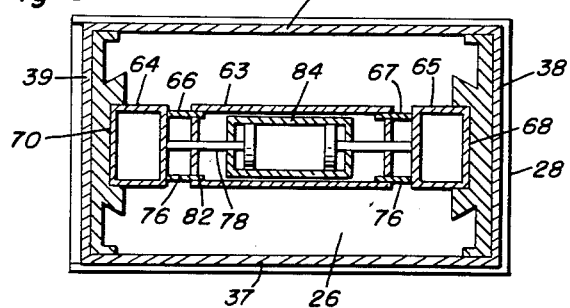
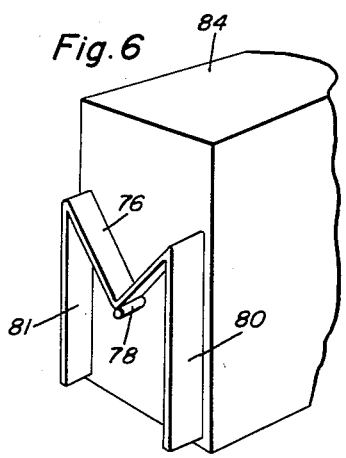
Julius Adams
INVENTOR.

June 13, 1961 J. ADAMS 2,987,795
MACHINE FOR MANUFACTURING BUILDING BLOCKS
Filed Aug. 11, 1955 3 Sheets-Sheet 3

Julius Adams
INVENTOR.

_United States Patent Office_

2,987,795
Patented June 13, 1961

2,987,795
MACHINE FOR MANUFACTURING BUILDING BLOCKS
Julius Adams, Jersey City, N.J., assignor, by mesne assignments, to William Rogers as assignee for the benefit of creditors of Presto Brick Machine Corp., New York, N.Y.
Filed Aug. 11, 1955, Ser. No. 527,769
1 Claim. (Cl. 25—41)

This invention relates to machines for manufacturing building blocks, and particularly to improvements in the type of building block manufacturing machine capable of producing concrete or like material blocks consisting of two slabs which in their vertical position are fastened together a specific distance apart by a transverse tie or ties having their ends molded in the slabs.

An object of this invention is to provide improvements in block manufacturing means enabling the machines to produce blocks at a higher rate and with a minimum of complexity of both operation and structure.

Another object of the invention is to provide an improved core unit for use in a mold box of a substantially conventional block manufacturing machine, the core unit having a channel in it accommodating a steel tie whose ends are adapted to be molded in the block together with a retainer for the tie, the retainer being movable into the core unit from the channel after the block mix has set, thereby facilitating removal of the block from the mold box.

Another object of this invention is to provide an improved structure for preventing the cementitious mix from entering the channel between cores of the multicore unit, the tie retainer forming part of this means and the remainder thereof comprising slides which are yieldingly secured to the block extruder and tamper of the block making machine.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is an enlarged fragmentray sectional view showing the mold box, core structure and tamper and extruder thereover;

FIGURE 3 is a sectional view taken substantially on the line 3—3 of FIGURE 2;

FIGURE 4 is a fragmentary sectional view in an enlarged scale taken on the line 4—4 of FIGURE 3;

FIGURE 5 is a sectional view taken on the line 5—5 of FIGURE 4;

FIGURE 6 is a fragmentary perspective view of the core structure showing primarily the tie retainer which is extended into the channel between cores of the core unit or structure;

There are currently available and presently manufactured several building block manufacturing machines which use the general principle of lifting the mold from the block. The process involved in making blocks in this manner is fully described in a number of U.S. patents, a current one being issued to M. R. Warren on September 22, 1953, and identified as Patent No. 2,652,613. In such machines, there are a pallet bin wherein a quantity of pallets are stored. They are conveyed in cycles to the pallet support by means of a conveyor belt having hooks fastened at intervals which engage the pallet and extract it from the pallet bin.

Figure 1:
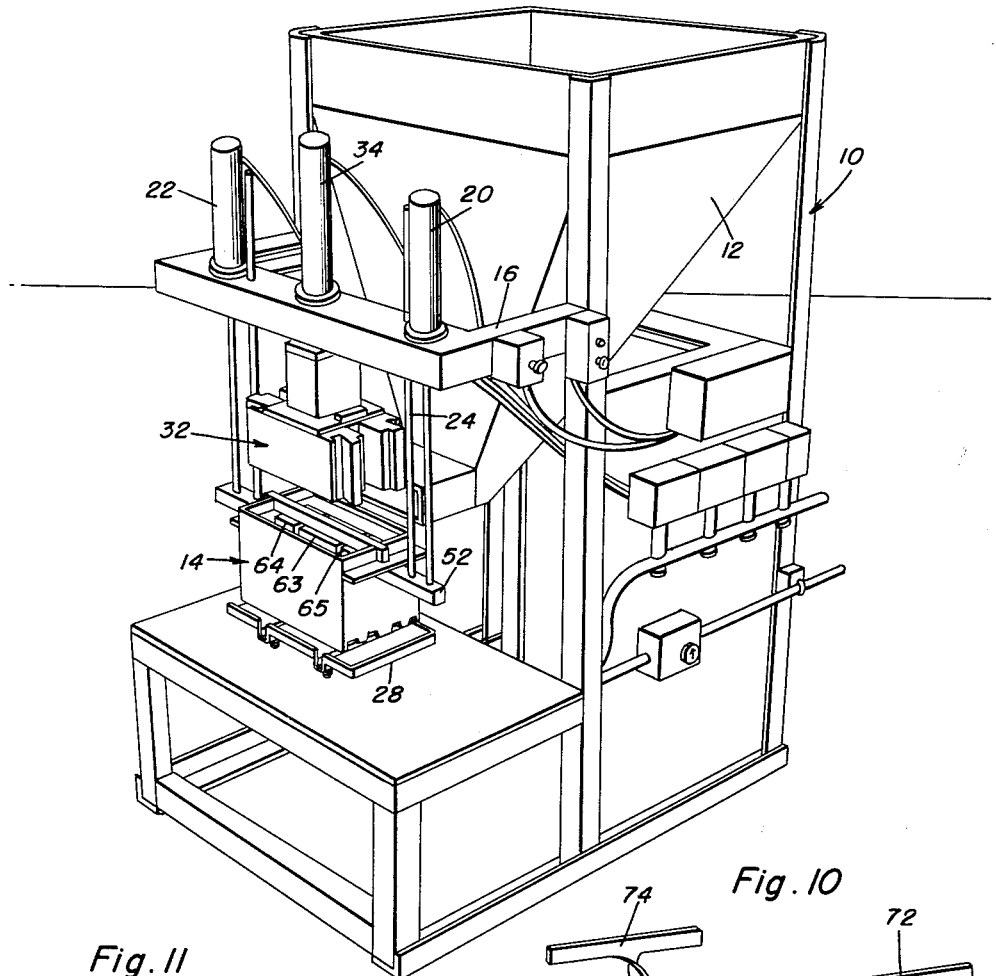
FIGURE 1 is a perspective view of a block manufacturing machine which has been revised structurally to produce blocks of concrete or like material which comprise two slabs fastened together a specific distance apart by transverse ties and having their ends molded in the slabs.
Figure 11:
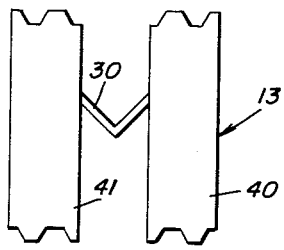
FIGURE 11 is a transverse sectional view of a typical block manufactured by the improved building block manufacturing machine.
Figure 10:
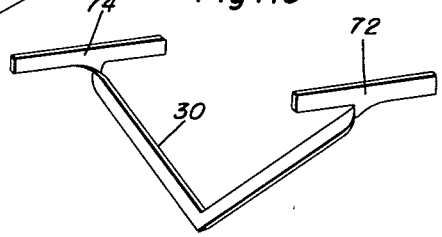
FIGURE 10 is a perspective view of a typical tie used in construction of the blocks made by the machine of FIGURE 1.
Figure 7:
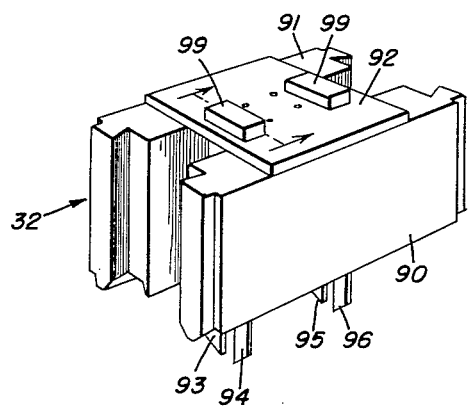
FIGURE 7 is a view of the tamper and extruder for blocks that is utilized in connection with the block making machine of FIGURE 1.
Figure 8:
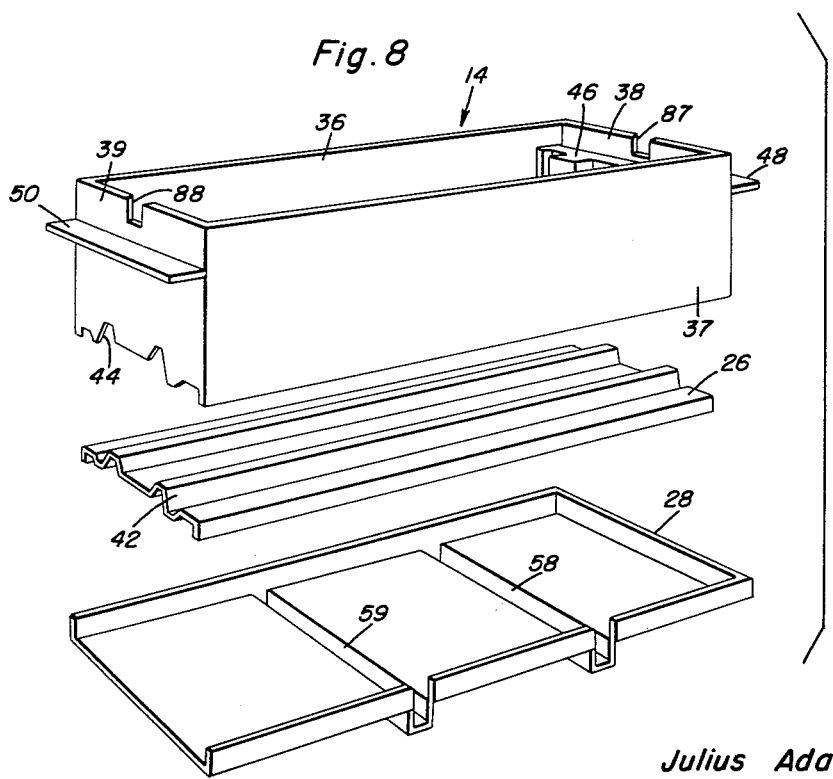
FIGURE 8 is an exploded perspective view of the mold box, pallet and pallet lift used in the machine of FIGURE 1.

The block manufacturing machine 10 includes among other necessary structure a hopper 12 adapted to contain the cementitious mix for making building blocks 13, means to meter measured quantities of the mix and deposit it in a mold box, such as box 14 of FIGURE 8, and a support 16. At the start of the production cycle for a block, the mold box 14 is elevated by means of pistons in cylinders 20 and 22, the guide rods 24 passing through guide apertures in the support 16 which carries cylinders 20 and 22. Then, the pallet 26 is brought into position on the pallet support 28 by means of the previously mentioned conveyor belt and hooks, not shown. Mold box 14 is then lowered to rest on the pallet 26. Ties, such as tie 30 of FIGURE 10, are placed properly in the mold box core unit and the mold box 14 is filled with a measured quantity of cementitious aggregate. The block tamper and ejector 32 is lowered by means of the piston in power cylinder 34 until the tamper enters the mold box and compresses the mix therein. The means retaining the ties 30 in place in the core channels are retracted, and mold box 14 is elevated from the block which is left on the pallet 26. At this time, the tamper 32 remains in contact with the top of the block until the mold box is stripped from it, and then, the tamper is elevated slightly so that the block on its pallet may be removed for placement in a curing chamber. The machine 10 would now be ready for a second cycle of operation.

Mold box 14 has sides 36 and 37 together with ends 38 and 39. It has an open top and an open bottom, pallet 26 functioning as the bottom of the mold box. Inasmuch as it is desired to manufacture blocks 13 which consist of two separate slabs 40 and 41 held spaced apart by means of tie 30, and all edges of the slabs 40 and 41 grooved or ribbed in order to have an interlocking block, pallet 26 is provided with longitudinal ribs 42 in order to form the ribs and grooves in the finished block. Ends 38 and 39 have appropriately shaped bottom edges 44 in order to be engaged with the ribs 42 of pallet 26 in a tight fit. Additionally, template panels 46 are detachably secured to the ends 38 and 39 in order to form the end grooves and ribs on the finished blocks 13. Laterally projecting flanges 48 and 50 are secured to the ends 38 and 39 of mold box 14 in order to provide means to which the lift bars 52 and 54 are fastened, the lift bars being rigidly attached to the pistons in power cylinders 20 and 22.

The pallet support 28 consists of a platform with two recessed channels 58 and 59, the purpose of which is to provide suitable means for introducing the prongs of the pallet and block off bearer. The platform (FIGURE 8) is enclosed except at one end where the pallet 26 is introduced, providing the necessary registration for the pallet. Springs 60 (FIGURE 2) serve as shock absorbers for the lowering mold box and tamper, if these should drop too hard and to absorb the vibration of the whole mold box structure if vibration should be applied to the mold box during tamping to induce better compression of the cement aggregate.

In order to construct block 13 there is a mold core unit in the mold box 14. This unit comprises two or more cores which are spaced apart to form channels therebetween. There is a central core 63 together with flanking cores 64 and 65. Channel 66 remains between cores 63 and 64, and channel 67 remains between cores 63 and 65. Vertical slots 68 and 70 are formed in the end templates 46 in order to accommodate the flanking cores 64 and 65 (FIGURE 5.).

The preferred tie 30 (FIGURE 10) is V-shaped and has transverse end legs 72 and 74 which are adapted to be imbedded in the slabs 40 and 41 of block 13. The V-shape of the intermediate portion of tie 30 will permit the tie to function as a condensation drip collector.

Considerable difficulty has been encountered in the means for holding the ties in place during the molding operation. This problem is solved by providing a substantially V-shaped retainer (FIGURE 6) 76, fixed at its apex to a rod 78 and having depending sides 80 and 81 at the ends of retainer 76. A passage 82 is formed in the core 63 allowing retainer 76 and its sides to be retracted therein by pneumatically or hydraulically withdrawing piston rod 78 into its cylinder 84. As shown in FIGURE 5, cylinder 84 is double acting, that is, there are two pistons and piston rods therein and the control conduits 86 are arranged such as to cause the piston rods to be expelled from the cylinder 84 simultaneously and withdrawn thereinto at the same time. This causes a corresponding movement of the tie retainers into and from the channels 66 and 67.

The core unit is held together as a rigid unified structure by means of a cross-bar 86 which is secured to the tops of cores 63, 64 and 65 and which is secured at its ends to the flanges 48 and 50 after passing through notches 87 and 88 formed in the ends of mold box 14.

The tamper 32 comprises a pair of blocks 90 and 91 held in spaced, parallel relationship by a top plate 92 to which they are fastened. The ends of the blocks 90 and 91 are fashioned to fit in the grooves in the end templates 46 of mold box 14 when the tamper and block ejector 32 is lowered into the mold box.

Figure 9:
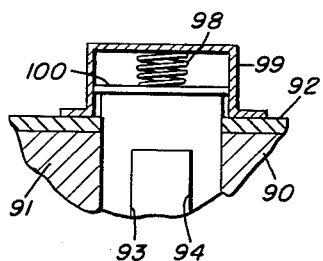
FIGURE 9 is an enlarged sectional detail taken on a line 9—9 of FIGURE 7 showing the manner of fastening the core channel slides which coact with the tie retainer to prevent the cementitious mix from entering the channel between cores of the core unit.

Tamper 32 has means thereon for fitting in channels 66 and 67 and at the top parts thereof to squeeze the cementitious block mix from the channels and prevent it from entering the channels while the tamper exerts a pressure on the mix in the mold box. Sides 80 and 81 of the tie retainer partially close each channel, and the slides for barriers for the remaining parts of each channel. Each slide of the group 93, 94, 95 and 96, respectively, consists of a slide plate which passes through guides 97 on the blocks 90 and 91 of tamper 32. The outer ends of each slide are beveled slightly to match with the angularity of the tie 30 and tie retainer 76. Moreover, each barrier forming slide is resiliently mounted on the tamper. This is accomplished by having a spring 98 react on a support housing 99, carried by the tamper, and also react on an enlarged end 100 which is secured to two of the slides, inasmuch as the slides are formed in pairs, as shown by the slides 93 and 94 in FIGURE 9. The enlarged end 100 limits the downward movement of the pair of slides in one direction by abutting a part of the plate 92, and the upward movement of the pair of slides is limited by the spring 100.

The general operation of the machine 10 in manufacturing the blocks has been described previously. Specifically, the retainers 76 are extended from the central mold 63 into the channels 66 and 67. Then, the ties 30 are dropped thereon, and the cementitious mix placed in the mold voids. After the tamper 32 is brought down to apply pressure to the mix and to project the barriers into channels 66 and 67, the mold box is stripped from the block and the tamper 32 lifted from the block so that it, together with its pallet 26, may be removed from the machine.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination in a building block manufacturing machine, a mold box into which there is adapted to be deposited a cementitious aggregate incapable at the time of deposit of resisting extraneous deforming pressures and hardenable into a rigid material, said mold box including a pair of side-by-side cavities separated by a core and having open tops and open bottoms so as to form said aggregate when hardened into a pair of spaced slabs, said core being provided with vertical slots extending to a surface of the mold box whereby to permit the withdrawal from the mold box of ties connecting the slabs, means for removably supporting ties in said core with the ends thereof located in said cavities so that when the aggregate is hardened said ties will maintain the slabs in the same predetermined position in which they were molded, said means comprising members located within the core and movable relative thereto from a position in which they leave the slots clear to a position in which they obstruct the slots, fluid actuated means within the core for moving said members, a single pallet having ribs thereon running obliquely to the perpendicular distance between the cavities and having at least one such rib associated with each cavity, said ribbed pallet being wholly below and entirely forming the bottom of both said cavities, a pallet support on which the pallet rests and which holds the pallet against the bottom of the mold box, and a tamper adapted to be inserted into the tops of the cavities and to engage the cementitious aggregate deposited therein for compressing and subsequently aiding in stripping of the slabs from the mold box, said tamper including two members, a single one for each of the cavities, said mold box being movable relatively into engagement with and away from the pallet so that when the mold box is relatively moved away from the pallet while the tamper holds the slabs against the pallet the mold box will be stripped from the molded slabs of cementitious aggregate, said ribs being sufficiently high to maintain the still unhardened slabs of cementitious aggregate in their predetermined spaced relationship after they are withdrawn from the mold and before they are hardened and while the ties still are incapable of maintaining the slabs in such relationship.

References Cited in the file of this patent

UNITED STATES PATENTS

| | | |
|---|---|---|
| 940,935 | Larsen | Nov. 23, 1909 |
| 1,468,065 | Williams | Sept. 18, 1923 |
| 1,706,647 | Besser | Mar. 26, 1929 |
| 2,492,415 | Coates et al. | Dec. 27, 1949 |
| 2,532,049 | Wittke | Nov. 28, 1950 |
| 2,533,479 | Leggat | Dec. 12, 1950 |
| 2,583,104 | Jentsch | Jan. 22, 1952 |
| 2,583,597 | Ryner | Jan. 29, 1952 |
| 2,614,308 | Burkard et al. | Oct. 21, 1952 |